US009522648B2

(12) United States Patent
Fukawatase

(10) Patent No.: US 9,522,648 B2
(45) Date of Patent: Dec. 20, 2016

(54) FRONT SEAT AIRBAG SYSTEM

(71) Applicant: Toyota Jidosha Kabushiki Kaisha, Toyota-shi Aichi-ken (JP)

(72) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 28 days.

(21) Appl. No.: 14/563,161

(22) Filed: Dec. 8, 2014

(65) Prior Publication Data

US 2015/0166002 A1    Jun. 18, 2015

(30) Foreign Application Priority Data

Dec. 12, 2013   (JP) ................................. 2013-257116

(51) Int. Cl.

| | |
|---|---|
| *B60R 21/233* | (2006.01) |
| *B60R 21/205* | (2011.01) |
| *B60R 21/231* | (2011.01) |
| *B60R 21/2342* | (2011.01) |
| *B60R 21/2338* | (2011.01) |
| *B60R 21/015* | (2006.01) |
| *B60R 21/013* | (2006.01) |

(52) U.S. Cl.
CPC .......... *B60R 21/233* (2013.01); *B60R 21/205* (2013.01); *B60R 21/231* (2013.01); *B60R 21/2342* (2013.01); *B60R 21/013* (2013.01); *B60R 21/01558* (2014.10); *B60R 2021/23107* (2013.01); *B60R 2021/23308* (2013.01); *B60R 2021/23382* (2013.01)

(58) Field of Classification Search
CPC .. B60R 21/233; B60R 21/2342; B60R 21/231; B60R 21/205; B60R 2021/23308; B60R 2021/23382; B60R 2021/23107
USPC ............................................ 701/45; 280/729
See application file for complete search history.

(56) References Cited

U.S. PATENT DOCUMENTS

| | | | | |
|---|---|---|---|---|
| 3,801,126 A | * | 4/1974 | Knight, IV | ........... B60R 21/205 180/90 |
| 4,262,931 A | * | 4/1981 | Strasser | ................ B60R 21/233 280/729 |
| 5,380,038 A | * | 1/1995 | Hawthorn | ............. B60R 21/233 280/730.1 |

(Continued)

FOREIGN PATENT DOCUMENTS

| | | |
|---|---|---|
| FR | 2876334 A1 | 4/2006 |
| JP | H0332956 A | 2/1991 |

(Continued)

*Primary Examiner* — Karen Beck
(74) *Attorney, Agent, or Firm* — Dinsmore & Shohl LLP

(57) ABSTRACT

A front seat airbag system includes: a driver's seat airbag which is inflated and deployed in front of a driver's seat by being supplied with gas; a passenger seat airbag which is inflated and deployed in front of a passenger seat by being supplied with gas; and a center airbag which is accommodated in an instrument panel together with the passenger seat airbag and when supplied with gas, inflated and deployed on a vehicle central side of the passenger seat airbag in a vehicle width direction such that a rear end side thereof in the vehicle longitudinal direction is configured to separate in the vehicle width direction from the rear end side of the passenger seat airbag in the vehicle longitudinal direction.

20 Claims, 6 Drawing Sheets

(56) References Cited

U.S. PATENT DOCUMENTS

| | | | | |
|---|---|---|---|---|
| 5,609,363 | A * | 3/1997 | Finelli | B60R 21/231 280/730.1 |
| 8,215,665 | B2 * | 7/2012 | Ohara | B60R 21/206 280/729 |
| 9,162,645 | B2 * | 10/2015 | Cho | B60R 21/205 |
| 9,248,799 | B2 * | 2/2016 | Schneider | B60R 21/205 |
| 9,272,684 | B1 * | 3/2016 | Keyser | B60R 21/237 |
| 2002/0135164 | A1 * | 9/2002 | Thomas | B60R 21/205 280/732 |
| 2003/0034638 | A1 * | 2/2003 | Yoshida | B60R 21/233 280/729 |
| 2003/0114972 | A1 * | 6/2003 | Takafuji | B60R 21/0134 701/45 |
| 2004/0102883 | A1 * | 5/2004 | Sala | B60R 21/0132 701/46 |
| 2005/0029781 | A1 * | 2/2005 | Enders | B60R 21/205 280/732 |
| 2008/0048420 | A1 * | 2/2008 | Washino | B60R 21/203 280/731 |
| 2009/0121462 | A1 * | 5/2009 | Rick | B60R 21/206 280/729 |
| 2014/0375033 | A1 * | 12/2014 | Fukawatase | B60R 21/214 280/729 |
| 2015/0054267 | A1 * | 2/2015 | Komamura | B60R 21/276 280/735 |
| 2015/0158452 | A1 * | 6/2015 | Choi | B60R 21/233 280/732 |
| 2015/0166002 | A1 * | 6/2015 | Fukawatase | B60R 21/233 280/730.1 |
| 2015/0175116 | A1 * | 6/2015 | Cho | B60R 21/205 280/729 |
| 2015/0258958 | A1 * | 9/2015 | Belwafa | B60R 21/233 280/729 |
| 2015/0258959 | A1 * | 9/2015 | Belwafa | B60R 21/233 280/729 |
| 2015/0298643 | A1 * | 10/2015 | Schneider | B60R 21/233 280/729 |
| 2015/0343986 | A1 * | 12/2015 | Schneider | B60R 21/205 280/729 |
| 2015/0367802 | A1 * | 12/2015 | Fukawatase | B60R 21/205 280/732 |
| 2016/0039385 | A1 * | 2/2016 | Watamori | B60R 21/23138 280/730.1 |
| 2016/0046254 | A1 * | 2/2016 | Yamada | B60R 21/233 280/729 |
| 2016/0046257 | A1 * | 2/2016 | Yamada | B60R 21/2338 280/729 |
| 2016/0059817 | A1 * | 3/2016 | Umehara | B60R 21/233 280/729 |

FOREIGN PATENT DOCUMENTS

| | | |
|---|---|---|
| JP | 06-024282 A | 2/1994 |
| JP | 06-072276 A | 3/1994 |
| JP | 06-080057 A | 3/1994 |
| JP | H0672275 | 3/1994 |
| JP | 06-206510 A | 7/1994 |
| JP | 2010-000825 A | 1/2010 |
| JP | 2012-056371 A | 3/2012 |

* cited by examiner

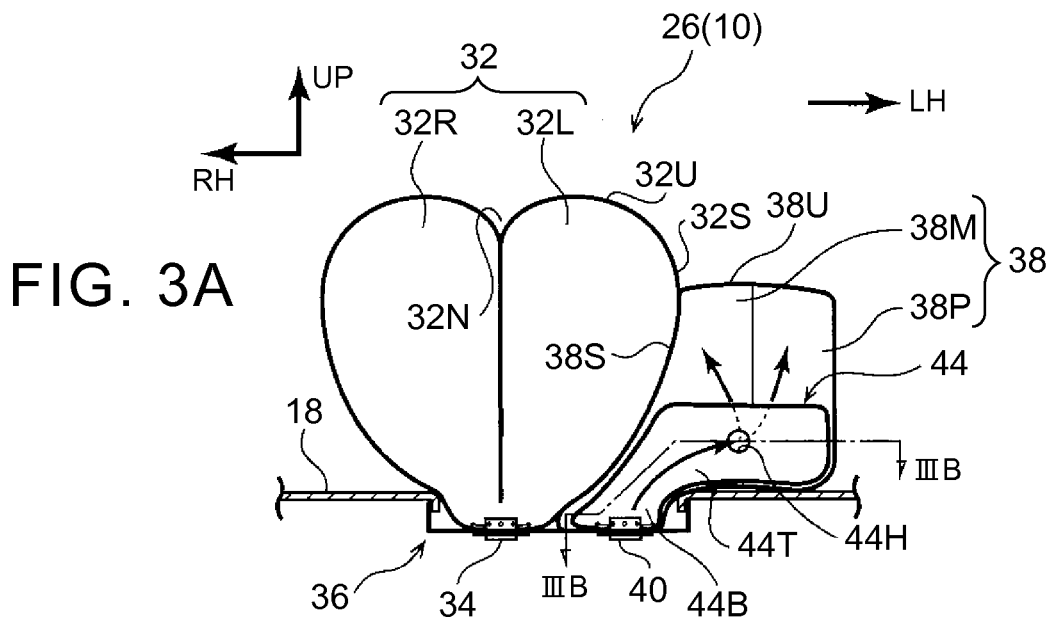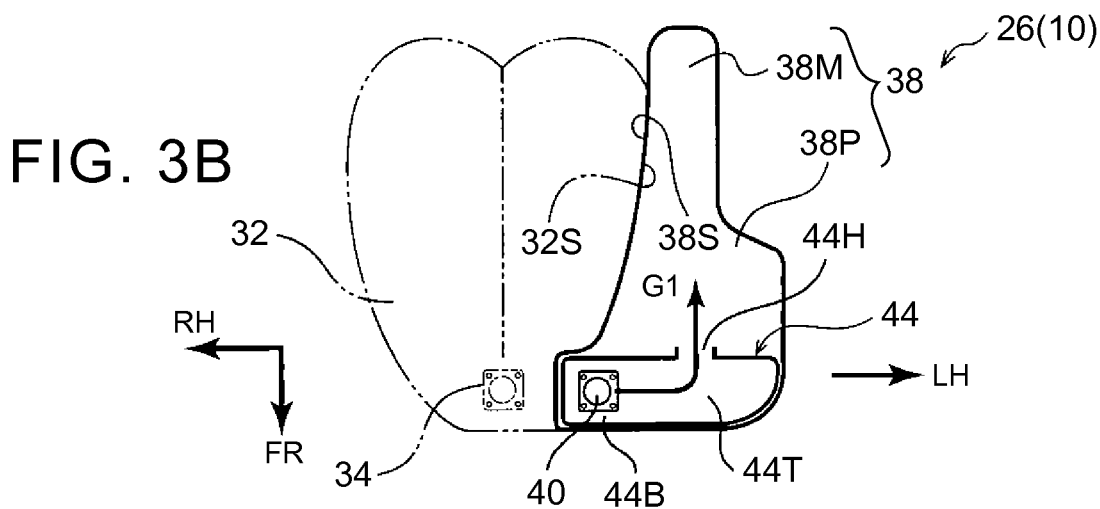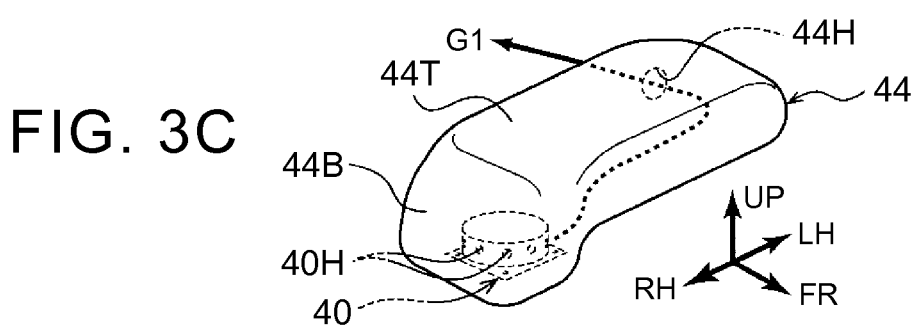

FRONT SEAT AIRBAG SYSTEM

INCORPORATION BY REFERENCE

The disclosure of Japanese Patent Application No. 2013-257116 filed on Dec. 12, 2013 including the specification, drawings and abstract is incorporated herein by reference in its entirety.

BACKGROUND OF THE INVENTION

1. Field of the Invention

The present invention relates to a front seat airbag system.

2. Description of Related Art

In an airbag system for a passenger seat, an apparatus in which a pair of extension portions extend to the rear of a vehicle from a portion of a height corresponding to the head or the shoulder of the occupant in a pair of bulging portions has been known (see Japanese Patent Application Publication No. 2012-56371 (JP 2012-56371 A), for example).

With the above-described structure, an occupant of a passenger seat who at the time of an oblique collision of the vehicle, is about to be moved to the collision side obliquely forward can be constrained. In this case, the airbag is moved to the collision side together with the occupant in the passenger seat while constraining the occupant in the passenger seat. By the way, at the time of such an oblique collision, an occupant in a driver's seat is also moved to the collision side obliquely forward. Thus, there is a room to be improved about constraining of the occupant in the driver's seat.

SUMMARY OF THE INVENTION

The present invention provides a front seat airbag system capable of constraining an occupant in a driver's seat appropriately against an oblique collision or small overlap collision to a passenger seat side.

A first aspect of the present invention relates to a front seat airbag system. The front seat airbag system includes: a driver's seat airbag which is inflated and deployed in front of a driver's seat by being supplied with gas; a passenger seat airbag which is inflated and deployed in front of a passenger seat by being supplied with gas; and a center airbag which is accommodated in an instrument panel together with the passenger seat airbag and, when supplied with gas, is inflated and deployed on a vehicle central side of the passenger seat airbag in a vehicle width direction such that a rear end side thereof in the vehicle longitudinal direction is configured to separate in the vehicle width direction from the rear end side of the passenger seat airbag in the vehicle longitudinal direction.

In this front seat airbag system, for example when an oblique collision or a small overlap collision occurs, the driver's seat airbag, the passenger seat airbag and the center airbag are supplied with gas so that they are inflated and deployed. The center airbag accommodated in the instrument panel together with the passenger seat airbag is inflated and deployed out of the instrument panel together with the passenger seat airbag.

Then, when the oblique collision or the small overlap collision to the driver's seat side occurs, the passenger seat occupant moving to an obliquely forward collision side (driver's seat side) is constrained by the passenger seat airbag and the center airbag. On the other hand, when the oblique collision or the small overlap collision to the passenger seat side occurs, the passenger seat occupant is moved to the obliquely forward collision side together with the passenger seat airbag while being constrained by the passenger seat airbag. Here, because the rear end side of the center airbag is capable of departing from the rear end side of the passenger seat airbag in the vehicle width direction, moving of the center airbag to the collision side is restrained compared to a structure in which the rear end side of the center airbag is connected to the rear end side of the passenger seat airbag integrally. Thus, the driver's seat occupant moving to the obliquely forward collision side (passenger seat side) is constrained by the driver's seat airbag and the center airbag.

Thus, in the above-described aspect, when the oblique collision or the small overlap collision to the passenger seat side occurs, the driver's seat occupant can be constrained appropriately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a diagram showing components of the front seat airbag system according to the embodiment of the present invention and a sectional view taken along the line IIIA-IIIA in FIG. 1;

FIG. 3B is a diagram showing components of the front seat airbag system according to the embodiment of the present invention and a sectional view taken along the line IIIB-IIIB in FIG. 3A;

FIG. 3C is a diagram showing components of the front seat airbag system according to the embodiment of the present invention and a perspective view showing an inner bag;

DETAILED DESCRIPTION OF EMBODIMENTS

A front seat airbag system 10 according to an embodiment of the present invention will be described with reference to FIGS. 1 to 4. In the meantime, arrows FR, UP, LH and RH described appropriately in each drawing indicate forward, upward of a vehicle V (see FIG. 2) on which the front seat airbag system 10 is applied, left side which is one side in the vehicle width direction thereof and right side which is the other side thereof. Hereinafter, when describing just with front/rear, up/down or right/left, it is assumed that they mean the front/rear in the longitudinal direction of a vehicle, up/down in the up-and-down direction of the vehicle and right/left in the width direction of the vehicle (as it faces forward), respectively, unless otherwise mentioned.

[Schematic Structure of the Interior of Vehicle V]

Figure 1:
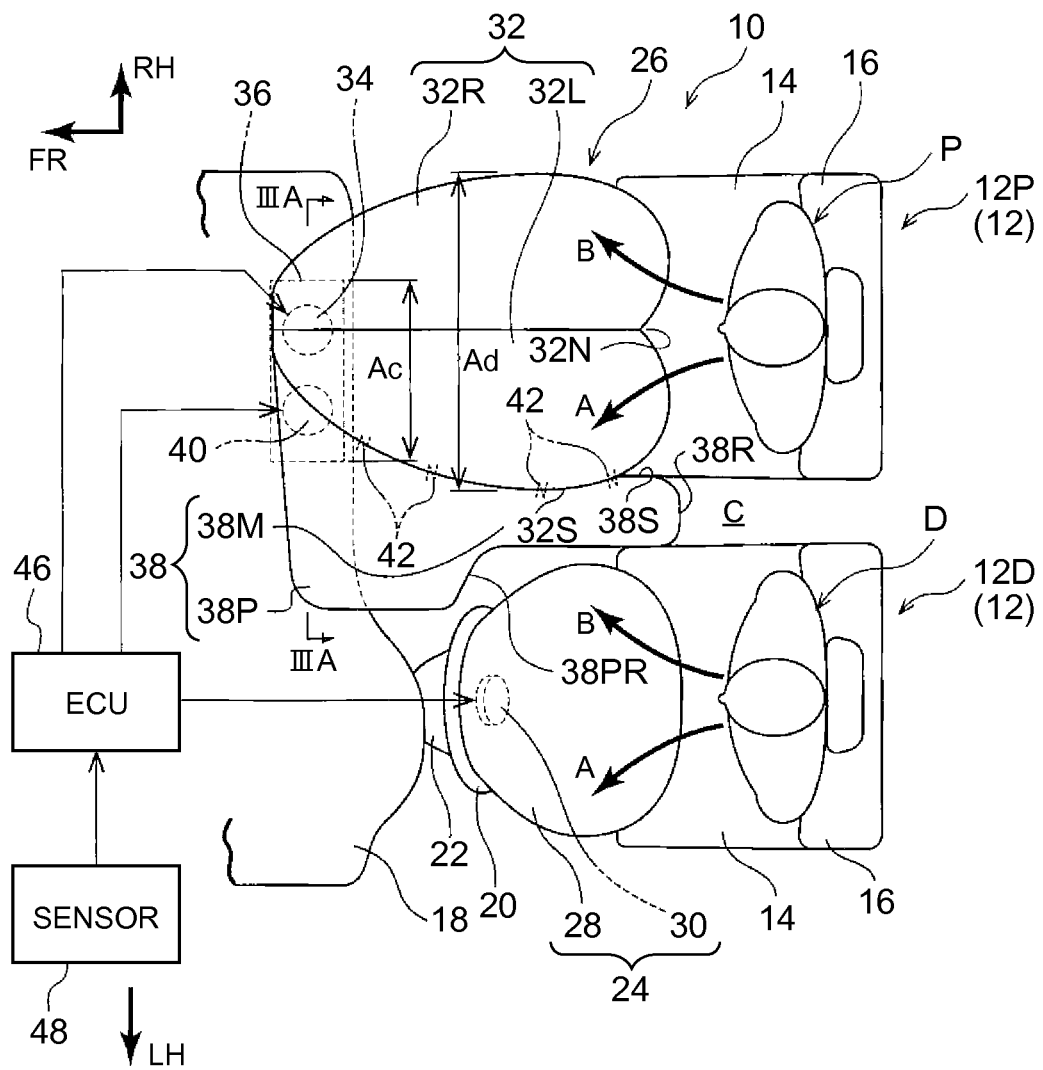
FIG. 1 is a plan view showing a schematic entire structure of a front seat airbag system according to an embodiment of the present invention.

FIG. 1 shows a part of the interior of a cabin C in a vehicle V on which a front seat airbag system 10 is applied including a front section thereof through a schematic plan view. In the meantime, FIG. 1 shows a driver's seat airbag 28, a passenger seat airbag 32, and a center airbag 38 in their inflated and deployed states. As shown in this figure, a pair of vehicle seats 12 for the right and left are arranged in parallel on the right and left sides in the cabin C. Each vehicle seat 12 is constructed so as to include a seat cushion 14 and a seat back 16 whose bottom end is connected to a rear end of the seat cushion 14.

In the present embodiment, a vehicle seat 12 located on the left side is driver's seat 12D and a vehicle seat 12 located on the right side is passenger seat 12P. A center console is arranged between the driver's seat 12D and the passenger seat 12P although not shown. That is, a vehicle V on which the front seat airbag system 10 of the present embodiment is applied has a structure in which no central seat is arranged between the driver's seat 12D and the passenger seat 12P. In the meantime, a structure in which no center console is provided (for example, a structure in which a space between the right and left vehicle seats 12 is used as a passage) is permissible.

The front end of the above-mentioned center console is connected to the central portion of an instrument panel 18 in the vehicle width direction extending in the vehicle width direction in front of the driver's seat 12D and the passenger seat 12P. A steering wheel 20 is arranged on the driver's seat 12D side of the instrument panel 18 in the vehicle width direction. The steering wheel 20 is arranged on the driver's seat 12D side relative to the instrument panel 18 (backward) in the vehicle longitudinal direction by being supported via a steering column 22.

Further, in the vehicle V, the driver's seat 12D and the passenger seat 12P are provided with each seat belt device (not shown) for constraining an occupant. In the present embodiment, the seat belt devices of the driver's seat 12D and the passenger seat 12P are three-point seat belt devices. Thus, an occupant D on the driver's seat 12D (hereinafter referred to as "driver D") and an occupant P on the passenger seat 12P (hereinafter referred to as "passenger seat occupant P") are constrained to the driver's seat 12D and the passenger seat 12P, respectively via their waists by means of a wrap belt while their upper bodies are constrained by a shoulder belt.

Figure 2:
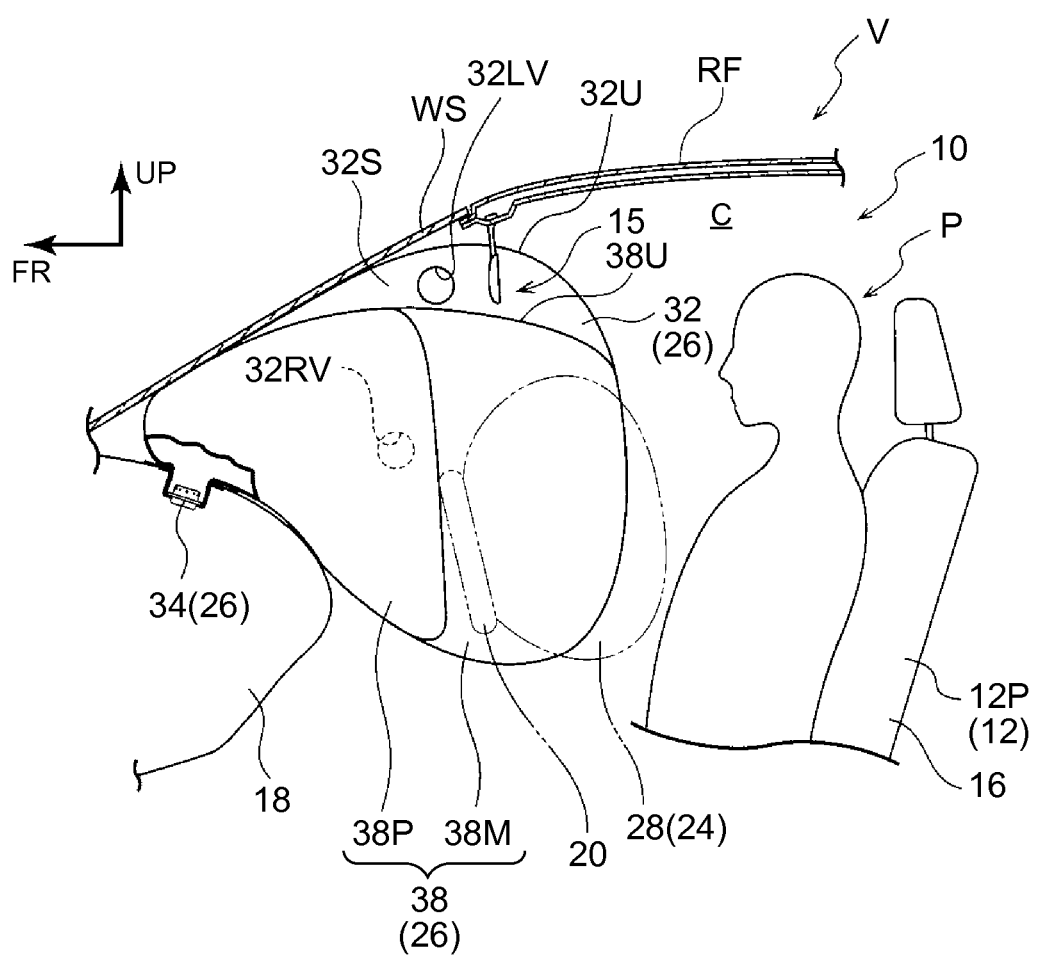
FIG. 2 is a side view of the front seat airbag system according to the embodiment of the present invention as seen from a driver's seat side.

As shown in FIG. 2, a room mirror 15 is provided in front of and above a vehicle seat 12 in the cabin C. The room mirror 15 is arranged at a central portion on top of a window shield glass or at the front end of a roof RF in the vehicle width direction.

[Front Seat Airbag System]

As shown in FIG. 1, the front seat airbag system 10 includes a driver's seat airbag device 24 for protecting the driver D from a front collision. The front seat airbag system 10 further includes a passenger seat airbag device 26 for protecting the passenger seat occupant P against the front collision.

(Driver's Seat Airbag Device)

The driver's seat airbag device 24 is provided within the rear end portion of the steering column 22 in the central portion of the steering wheel 20. This driver's seat airbag device 24 includes a driver's seat airbag 28, an inflator 30 which serves as a gas supplying device and an airbag case (not shown). The driver's seat airbag 28 is accommodated in the airbag case together with the inflator 30 in a state in which it is folded with the inflator 30 incorporated in a proximal end portion thereof.

An airbag case constituted of the driver's seat airbag 28 and the inflator 30 as modules is accommodated within the rear end portion of the steering column 22. Further, opening portions facing backward of the airbag case and the steering column 22 are closed with a steering wheel pad (not shown).

In the driver's seat airbag device 24, when the inflator 30 is activated by an airbag ECU 46 described later, the driver's seat airbag 28 is inflated and deployed by being supplied with gas generated by the inflator 30. Accompanied with inflation and deployment, the driver's seat airbag 28 breaks the steering wheel pad, so that it is inflated and deployed on the driver's seat 12D side with respect to the steering wheel 20.

(General Structure of Passenger Seat Airbag Device)

The passenger seat airbag device 26 is provided within an instrument panel 18 in front of the passenger seat 12P. The passenger seat airbag device 26 includes the passenger seat airbag 32, an inflator 34 which serves as a gas supplying device and an airbag case 36. The passenger seat airbag 32 is accommodated in the airbag case 36 together with the inflator 34 in a state in which it is folded with the inflator 34 incorporated in a proximal end portion thereof.

The airbag case 36 constituted of the passenger seat airbag 32 and the inflator 34 as modules in this way is supported by an instrument panel reinforcement and the like (not shown) within the instrument panel 18. An airbag door is formed in the instrument panel 18 at a portion which covers this airbag case 36.

In the passenger seat airbag device 26, when the inflator 34 is activated by an airbag ECU 46 described later, the passenger seat airbag 32 is inflated and deployed by being supplied with gas generated by the inflator 34. Accompanied with inflation and deployment, the passenger seat airbag 32 breaks the airbag door (instrument panel 18), so that it is inflated and deployed on the passenger seat 12P side with respect to the instrument panel 18.

Next, an inflated and deployed shape (configuration) of the passenger seat airbag 32 will be described. In the meantime, the inflated and deployed shape described below is an inflated and deployed shape under a non-constrained (free of constraint) inflated and deployed state which is a state not constraining the passenger seat occupant P. As shown in FIG. 1, the passenger seat airbag 32 includes a left bag 32L and a right bag 32R and is so constructed to be inflated and deployed into a shape substantially symmetrical as viewed in a plan view. The left bag 32L and the right bag 32R are formed in the form of a bag and connected to each other and further, communicate with each other at least via their front sides.

As a result, the right bag 32R and the left bag 32L are supplied with gas from the common inflator 34 and are inflated and deployed as a single passenger seat airbag 32. That is, the passenger seat airbag 32 is a so-called twin-chamber type airbag.

If the center line of the passenger seat airbag 32 which is a border line between the left bag 32L and the right bag 32R in the vehicle width direction is extended, it substantially coincides with the center line of the passenger seat 12P in the seat width (vehicle width) direction (not shown). In this inflated and deployed state, the rear end of the left bag 32L is located in front of the left shoulder of the passenger seat occupant P and the rear end of the right bag 32R is located in front of the right shoulder of the passenger seat occupant P. A recess portion 32N formed between the rear ends of the left bag 32L and the right bag 32R is located in front of the head of the passenger seat occupant P. In the present embodiment, the inflator 34 is arranged so that the center line thereof in the vehicle width direction substantially coincides with the center line of the passenger seat airbag 32 in the vehicle width direction when the inflation and deployment is completed.

As shown in FIG. 2, vent holes 32LV, 32RV for adjusting the internal pressure are formed in the left bag 32L and the right bag 32R of the passenger seat airbag 32. The vent hole 32RV of the right bag 32R is formed in a substantially central portion of a side wall facing outward in the vehicle width direction. On the other hand, the vent hole 32LV of the left bag 32L is formed on the top (described in detail later) of a side wall facing inward in the vehicle width direction.

The passenger seat airbag device 26 further includes a center airbag 38 and an inflator 40 which serves as a gas supplying device. Hereinafter, the components will be described in detail.

(Center Airbag)

The center airbag 38 is folded together with the passenger seat airbag 32 and accommodated in the airbag case 36 together with the passenger seat airbag 32 (not shown). An inflator 40 which serves as a gas supplying device is incorporated in the proximal portion of the center airbag 38. The center airbag 38 is so constructed that when the inflator 40 is activated by an airbag ECU 46 described later, it is inflated and deployed by being supplied with gas generated by the inflator 40. In the meantime, no vent hole is set in the center airbag 38.

<Inflated/Deployed Shape>

As shown in a plan view of FIG. 1, the center airbag 38 is constructed to be inflated and deployed inward of the passenger seat airbag 32 in a vehicle width direction (on a vehicle central side), that is, into a state adjacent to the passenger seat airbag 32 on the driver's seat airbag 28 side. The center airbag 38 is a bag body independent of the passenger seat airbag 32. A description about the shape of the center airbag 38 below indicates a shape in the inflated and deployed state unless specified otherwise.

A rear end 38R of the center airbag 38 (main body portion 38M described later) is located at an equivalent position to the rear end of the passenger seat airbag 32 (left bag 32L) or slightly backward thereof. A side wall 38S facing the passenger seat airbag 32 side at least on the rear end 38R side of the center airbag 38 is formed as a different bag body from a side wall 32S facing inward on the rear end side of the left bag 32L in the vehicle width direction in the inflated and deployed state and is opposed to (or in contact with) the side wall 32S. Thus, the center airbag 38 (side wall 38S thereof) can depart from the side wall 32S of the passenger seat airbag 32 in the vehicle width direction at least at the rear portion thereof.

As shown in FIGS. 2 and 3A, a top end 38U of the center airbag 38 is set lower than a top end 32U of the passenger seat airbag 32. More specifically, the center airbag 38 is so constructed not to interfere with the room mirror 15. The vent hole 32LV on the left bag 32L side of the abovementioned passenger seat airbag 32 is formed above the top end 38U of the center airbag 38.

Further, the center airbag 38 of the present embodiment includes the main body portion 38M having the abovementioned side wall 38S and a protruding portion 38P which is to be inflated and deployed such that it is protruded from the main body portion 38M to the driver's seat airbag 28 side in the inflated and deployed state. In the main body portion 38M, the rear end 38R is located at an equivalent position to the rear end of the passenger seat airbag 32 or slightly backward thereof, as described above.

As shown in FIG. 1, the protruding portion 38P is protruded to the driver's seat airbag 28 side from a section from the front end side of the main body portion 38M up to the vicinity of a central portion and a rear end position thereof in the vehicle longitudinal direction is located in front of the rear end 38R of the center airbag 38. More specifically, the protruding portion 38P is so constructed that a rear end 38PR thereof is located forward of the steering wheel 20 in order to inhibit the protruding portion 38P from interfering with the steering wheel 20 in the non-constrained state.

In the present embodiment, the rear end of the protruding portion 38P which is an end portion (left end) on the driver's seat airbag 28 side is located in the vicinity of a rim portion of the steering wheel 20. In the meantime, at least a part of the protruding portion 38P may be constructed to overlap an inside end (right end) of the driver's seat airbag 28 in the vehicle width direction (oppose each other in the vehicle longitudinal direction).

Further, the center airbag 38 in the non-constrained state is an deployed configuration (shape) which does not interfere with the driver's seat airbag 28 in the non-constrained state. That is, the center airbag 38 and the driver's seat airbag 28 are constructed not to affect the inflation and deployment configuration (shape, posture) of each other.

Although not shown, the above-described center airbag 38 is accommodated in the common airbag case 36 such that it is folded together with the passenger seat airbag. As shown in FIG. 1, an installation range Ac of the airbag case 36 (airbag module) in the vehicle width direction is structured to be capable of being accommodated in an inflation and deployment range Ad of mainly the passenger seat airbag 32 (width of the passenger seat 12P) in the vehicle width direction.

Thus, the center airbag 38 is inflated and deployed to a position which is offset inward with respect to the inflator 40 accommodated in the airbag case 36 in the vehicle width direction and further, it is inflated and deployed backward and adjacent to the passenger seat airbag 32. The airbag door set on the instrument panel 18 is arranged in the same range as the airbag case 36. In other words, the airbag case 36, the inflator 40 and the airbag door are arranged such that they are offset outward with respect to an expansion (expected) position of the center airbag 38 in the vehicle width direction.

From another point of view, as shown in FIG. 3A, the inflator 40 or the proximal end side of the center airbag 38 is located below the passenger seat airbag 32 in the inflated and deployed state (or in an inflating and expanding process). Thus, the center airbag is inflated and deployed outside the instrument panel 18 such that it goes around below the passenger seat airbag 32.

To secure the inflation and deployment of the center airbag 38 which is constructed to be inflated and deployed at a position offset inward with respect to the airbag case 36, the inflator 40, and the airbag door in the vehicle width direction, a following structure is adopted in the present embodiment.

<Tear Seam>

The center airbag 38 is connected to the passenger seat airbag 32 via a tear seam 42 (although shown in FIG. 1 for convenience, as described below, the tear seam 42 is broken when the inflation and expansion of the center airbag 38 is completed) in its folded state. When a shape in the inflated and deployed state is supposed, a region on the rear end side of the center airbag 38 in the vehicle longitudinal direction is connected to a region on the rear end side of the passenger seat airbag 32 in the vehicle longitudinal direction in the inflated and deployed state via the tear seam 42. As a result, at the initial period of the inflation and deployment, the center airbag 38 is pulled out of the instrument panel 18 with the inflation and deployment of the passenger seat airbag 32.

In a process of the inflation and deployment of the passenger seat airbag 32 and the center airbag 38, the tear seam 42 is broken by receiving a tension larger than its allowance. Thus, when the inflations and deployments of the passenger seat airbag 32 and the center airbag 38 are completed, the tear seam of the present embodiment has lost a function of keeping connection therebetween so that the center airbag 38 can separate from the passenger seat airbag 32.

<Inner Bag>

As shown in FIGS. 3A, 3B, an inner bag 44 (representation thereof is omitted in FIG. 1) which serves as a gas flow guide member is provided within the center airbag 38. The inner bag 44 is folded together with the center airbag 38. The inner bag 44 incorporates the inflator 40 inside the proximal end portion of the center airbag 38. Thus, the center airbag 38 is supplied with gas from the inflator 40 via the inner bag 4 arranged inside thereof. In the meantime, the inflator 40 is arranged in the inflation and deployment range of the passenger seat airbag 32 in the vehicle width direction and further arranged within the center airbag 38.

An deployment shape of the inner bag 44 will be described. As shown in FIG. 3C, the inner bag 44 includes a base portion 44B in which an inside end which is a proximal end thereof in the vehicle width direction covers the inflator 40 from above, and a cylindrical portion 44T which communicates with the base portion 44B while extending to the driver's seat airbag 28 side in the vehicle width direction. An end portion on an opposite side to the base portion 44B of the cylindrical portion 44T is closed. A flow-out port 44H which is a gas spouting portion which opens backward is formed in the cylindrical portion 44T. In the meantime, the base portion 44B of the inner bag 44 of the present embodiment may be of any structure as long as it covers at least an installation range of a spouting port 40H (see FIG. 3C) which is a gas outlet portion in the inflator 40 and it is not limited to a structure which covers the entire inflator 40.

Gas generated from the inflator 40 is supplied (spouted) backward into the center airbag 38 via the base portion 44B, the cylindrical portion 44T and the flow-out port 44H. That is, the inner bag 44 guides gas generated by the inflator 40 inward in the vehicle width direction and makes the gas flow out backward of the vehicle (see an arrow G1).

(Airbag ECU 46)

Further, the front seat airbag system 10 includes an airbag ECU 46 as a control device. The airbag ECU 46 is electrically connected to a collision sensor (or sensor group) 48. The airbag ECU 46 is electrically connected to the inflator 30 of the driver's seat airbag device 24 and the inflators 34, 40 of the passenger seat airbag device 26.

The airbag ECU 46 is capable of detecting or estimating various kinds of front collisions (occurrence thereof or that it is unavoidable) to the vehicle V to which the airbag ECU 46 is applied without distinguishing types of the front collisions (or depending on each collision type) based on information from the collision sensor 48. When the airbag ECU 46 detects or estimates the front collision based on information from the collision sensor 48, it activates the inflators 30, 34, 40. In the meantime, the front collision types in which the airbag ECU 46 activates the inflators 30, 34, 40 include a front collision to a position offset to one side in the vehicle width direction such as oblique collision and small overlap collision.

The oblique collision (MDB oblique collision) mentioned here is assumed to be a collision from obliquely forward (for example, a collision at a relative angle of 15° to a collision partner and having a wrap amount in the vehicle width direction of about 35%) specified according to NHTSA. In the present embodiment, an oblique collision at a relative speed of 90 km/hr is estimated as an example. Further, of the front collisions of the vehicle V, the small overlap collision is assumed to be collision having a wrap amount in the vehicle width direction to the collision partner of less than 25% specified according to IIHS, for example. For example, a collision to the outside of a front side member which is a vehicle skeleton in the vehicle width direction corresponds to the small overlap collision. In the present embodiment, as an example, a small overlap collision at a relative speed of 64 km/hr is estimated.

Further, in the present embodiment, the airbag ECU 46 activates the inflator 40 late by a predetermined time (e.g., about 5 [msec]) from an activation of the inflators 30, 34. The predetermined time is set up by considering an effect of pulling out the center airbag 38 from the instrument panel accompanied with the inflation and deployment of the passenger seat airbag 32 and a closing time for the opening portion in the instrument panel 18 (airbag door) by the passenger seat airbag 32. In the meantime, the airbag ECU 46 may be constructed to activate the inflators 30, 34, 40 at the same time.

[Operation]

Next, an operation of the present embodiment will be described.

When the airbag ECU 46 detects or estimates any front collision to the vehicle V according to a signal from the collision sensor 48, it activates the inflators 30, 34, 40. Then, the driver's seat airbag 28, which receives gas supplied from the inflator 30, is inflated and deployed while breaking the steering wheel pad.

Further, the passenger seat airbag 32, which receives gas supplied from the inflator 34 is inflated and deployed while breaking the airbag door set on the instrument panel 18. Then, the center airbag 38, which receives gas supplied from the inflator 40 is inflated and deployed from within the instrument panel 18 toward a cabin C together with the passenger seat airbag 32.

(Oblique Collision or Small Overlap Collision to Driver's Seat Side)

When the front collision to the vehicle V is an oblique collision or a small overlap collision to the driver's seat 12D side (left side), the driver D and the passenger seat occupant P are moved to the left side which is the collision side in the vehicle width direction with respect to the vehicle body while being moved forward as indicated with an arrow A in FIG. 1. In the meantime, when the driver D and the passenger seat occupant P who wear the 3-point seat belt device as described above are moved, they are inclined forward with respect to their waists.

In this case, the driver D is restrained from being moved to the collision side in the vehicle width direction while being moved forward with respect to the vehicle body by the driver's seat airbag 28 and other protective device (e.g., a curtain airbag device, not shown). In other words, the driver D moving to the obliquely forward collision side is constrained by the driver's seat airbag 28 and other protective device. On the other hand, the passenger seat occupant P is restrained from being moved to the collision side in the vehicle width direction while being moved forward by the passenger seat airbag 32 and the center airbag 38. In other words, the passenger seat occupant P moving to the obliquely forward collision side is constrained by the passenger seat airbag 32 and the center airbag 38.

More specifically, when the passenger seat occupant P moving in a direction indicated with the arrow A in FIG. 1 is constrained, the rear end side of the passenger seat airbag 32 is displaced inward in the vehicle width direction. Because this displacement is supported from inside in the vehicle width direction (collision side) by the center airbag 38 which is inflated and deployed adjacent to the inside of the passenger seat airbag 32 in the vehicle width direction, the passenger seat occupant P is restrained from being moved to the collision side effectively. Because the center airbag 38 is inflated and deployed from the instrument panel 18, a reaction force accompanied with constraining of the passenger seat occupant P is supported excellently by the instrument panel 18, a wind shield glass WS and the like.

(Oblique Collision or Small Overlap Collision to the Passenger Seat Side)

When the front collision to the vehicle V is an oblique collision or a small overlap collision to the passenger seat 12P side (right side), the driver D and the passenger seat occupant P are moved to the right side which is the collision side in the vehicle width direction with respect to the vehicle body while being moved forward as indicated with an arrow B in FIG. 1. When the driver D and the passenger seat occupant P who wear the 3-point seat belt device as described above are moved, they are inclined forward with respect to their waists.

In this case, the passenger seat occupant P is restrained from being moved to the collision side in the vehicle width direction while being moved forward with respect to the vehicle body by the passenger seat airbag 32 and other protective device (e.g., a curtain airbag device, not shown). In other words, the passenger seat occupant P moving to the obliquely forward collision side is constrained by the passenger seat airbag 32 and other protective device. On the other hand, the driver D is restrained from being moved to the collision side in the vehicle width direction while being moved forward by the driver's seat airbag 28 and the center airbag 38. In other words, the driver D moving to the obliquely forward collision side is constrained by the driver's seat airbag 28 and the center airbag 38. The protection (restraint) for the driver D against the oblique collision or the small overlap collision to the passenger seat side will be described additionally below.

<Protection for the Driver D Against the Oblique Collision or the Small Overlap Collision to the Passenger Seat Side>

Figure 4:
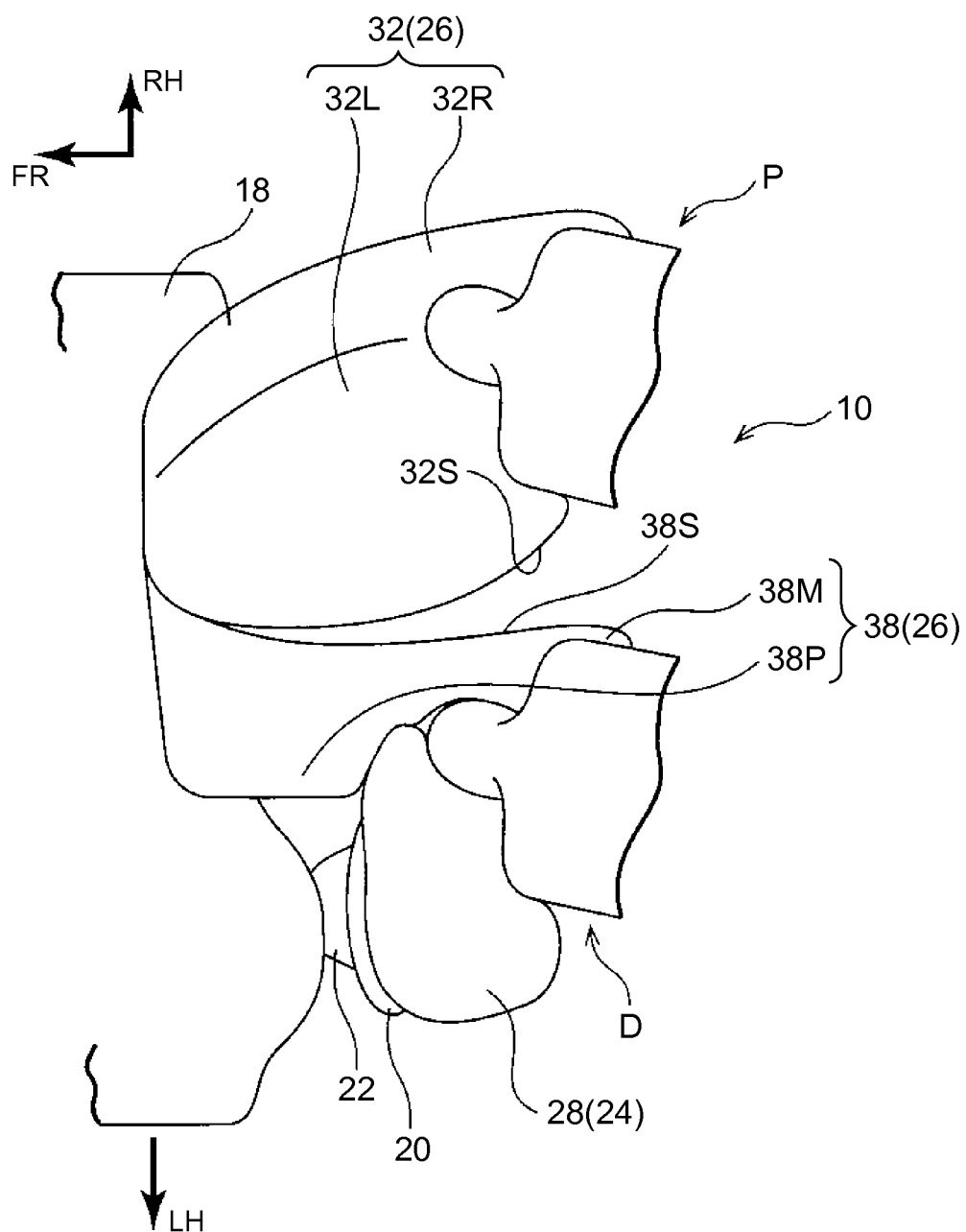
FIG. 4 is a plan view showing an occupant constraining state by the front seat airbag system according to the embodiment of the present invention when an oblique collision or a small overlap collision to the passenger seat side occurs.

Accompanied with constraining of the passenger seat occupant P moving to the collision side in the vehicle width direction (see the arrow B in FIG. 1) as described above, the rear end side of the passenger seat airbag 32 is moved to the collision side in the vehicle width direction as shown in FIG. 4. On the other hand, the tear seam 42 is broken in a process of the inflation and expansion of the center airbag 38, the center airbag 38 can separate from the passenger seat airbag 32 in the vehicle width direction at least at the rear end. As a result, even if the rear end of the passenger seat airbag 32 is moved to the collision side in the vehicle width direction, the center airbag 38 is restrained from following up the passenger seat airbag 32.

Then, accompanied with constraining of the driver D moving to the collision side in the vehicle width direction, the driver's seat airbag 28 is moved to the collision side in the vehicle width direction while constraining the driver D. At this time, moving of the driver's seat airbag 28 to the collision side in the vehicle width direction or moving of the driver D to the collision side in the vehicle width direction are restrained by interference thereof with the center airbag 38. That is, the driver D is constrained indirectly or directly by the center airbag via the driver's seat airbag 28 to restrain the moving to the collision side in the vehicle width direction. Because the center airbag 38 is inflated and deployed from the instrument panel 18, a reaction force accompanied with constraining of the driver D is supported excellently by the instrument panel 18, a wind shield glass WS and the like.

In this way, the front seat airbag system 10 of the present embodiment can appropriately constrain the driver D who is an occupant of the driver's seat 12D against the oblique collision or the small overlap collision to the passenger seat 12P side.

Particularly, the center airbag 38 of the present embodiment includes the protruding portion 38P which is to be inflated and deployed such that it is protruded from the main body portion 38M to the driver's seat airbag 28 side. As a result, the driver's seat airbag 28 moving to the collision side in the vehicle width direction as described above can be made to interfere with (support) the center airbag 38 via the protruding portion 38P in a wide range in the vehicle width direction. That is, this contributes to improvement of constraining performance for the driver D against the oblique collision or the small overlap collision to the passenger seat 12P side.

Further, because the rear end of the protruding portion 38P is located in front of the steering wheel 20, the protruding portion 38P can be provided not to interfere with the steering wheel 20 while securing the front-rear length of the main body portion 38M of the center airbag 38. For example, a comparative example in which the protruding portion interferes with the steering wheel 20 has a fear that the inflation and deployment position and the shape of the main body portion and the protruding portion may not be stabilized easily due to the interference. Contrary to this, the present embodiment can inflate and deplpoy the main body portion 38M and the protruding portion 38P stably at their predetermined (as designed) positions.

Likewise, in the front seat airbag system 10, the driver's seat airbag 28 and the center airbag 38 are adapted not to interfere with each other in the non-constrained inflated and deployed state which is an inflated and deployed state constraining no occupant. Thus, the driver's seat airbag 28, the passenger seat airbag 32, and the center airbag 38 are inflated and deployed each at an appropriate position, with an appropriate shape and an appropriate posture prior to constraining of an occupant so as to exert their predetermined occupant constraining performance.

<Inflation/Expansion Performance of Center Airbag>

Next, the inflation and deployment performance of the center airbag 38 will be described.

In the front seat airbag system 10, the center airbag 38 is inflated and deployed to a position offset inward with respect to the airbag case 36 of the passenger seat airbag device 26, the inflator 40 and the airbag door in the vehicle width direction.

Here, the center airbag 38 is connected to the passenger seat airbag 32 in a folded state via the tear seam 42. Thus, even in the initial period of the inflation and deployment, the center airbag 38 is pulled out of the instrument panel 18 by the inflated and deployed passenger seat airbag 32 while being inflated and deployed itself also. The tear seam 42 is broken in the process of the inflation and deployment or accompanied with constraining of the passenger seat occupant and after that, the rear end side of the center airbag 38 can separate from the rear end side of the passenger seat airbag 32 in the vehicle width direction. Particularly, in the structure in which the inflator 40 is activated late by a predetermined time (e.g., about 5 msec) after the inflator 34 is activated, a pull-out performance for the center airbag 38 by the passenger seat airbag 32 connected thereto via the tear seam 42 is remarkable. In the meantime, because the tear seam 42 is broken receiving a tension force larger than an allowance in a process of the inflation and deployment of the passenger seat airbag 32 and the center airbag 38, it never affects the above-described occupant constraining performance or its influence is remarkably small.

Further, the interior of the center airbag 38 is supplied with gas from the inflator 40 via the inner bag 44. More specifically, after gas from the inflator 40 is guided inward in the vehicle width direction, i.e., to an inflation and deployment (expected) position of the center airbag 38 by the cylindrical portion 44T of the inner bag 44, gas is supplied backward from the flow-out port 44H into the center airbag 38. More specifically, when the inflator 40 generates gas, gas is supplied into the interior of the inner bag 44 from the gas spouting port 40H. The inner bag 44 is formed cylindrically by gas pressure and guides gas supplied from the gas spouting port 40H of the inflator 40 toward the gas flow-out port 44H. Gas guided to the gas flow-out port 44H is spouted backward of the vehicle body from the gas flow-out port 44H. Thus, the center airbag 38 is inflated and deployed (folding is eliminated) backward so that it is inflated and deployed into a stable posture in a short time. Further, the center airbag 38 accommodated in the instrument panel 18 together with the passenger seat airbag 32 can be inflated and deployed in the predetermined direction by supplying gas from the inflator 40 arranged in the inflation and deployment range of the passenger seat airbag 32.

Further, because, as described above, the center airbag 38 is connected (restrained) to the passenger seat airbag 32 via the tear seam 42 in the initial period of the inflation and deployment, the center airbag 38 is restrained from being deployed in a direction of separating from the passenger seat airbag 32. Thus, the center airbag 38 is inflated and deployed easily into a more stable posture. Further, because the center airbag 38 is so designed into an inflated and deployed shape (dimension) in which the inflation and deployment height thereof is lower than the inflation and deployment height of the passenger seat airbag 32 and its top end 38U does not interfere with the room mirror 15, there is no influence on the inflated and deployed posture due to the interference with the room mirror 15, an overhead console and the like.

In the front seat airbag system 10, as described above, the center airbag 38 can be inflated and deployed with a stable posture to a position offset inward with respect to the airbag case 36, the inflator 40 and the airbag door in the vehicle width direction in a short time.

Further, the top end 38U of the center airbag 38 is set to be lower than the top end 32U of the passenger seat airbag 32. Thus, a vent hole 32LV can be arranged at an appropriate position in a structure in which the center airbag 38 is inflated and deployed adjacent to the passenger seat airbag 32. More specifically, the vent hole 32LV is formed at a portion of an inside wall 32S of the passenger seat airbag 32 at a higher position in a vehicle than the center airbag 38 which is to be inflated and deployed. Thus, gas is discharged from the passenger seat airbag 32 without being obstructed by the center airbag 38. Accompanied with constraining of the passenger seat occupant P by the passenger seat airbag 32, gas within the passenger seat airbag 32 is discharged via the vent hole 32LV without being obstructed by the center airbag 38.

Here, the center airbag 38 is accommodated in the airbag case 36 of the passenger seat airbag device 26 together with the inflator 40. As a result, the center airbag 38 and the inflator 40 are integrated with the passenger seat airbag device 26 as modules, so that mountability to the vehicle V is excellent. In the present embodiment, the passenger seat airbag device 26 is constituted such that the center airbag 38 and the inflator 40 are included.

<First Modification>

Although in the above-described embodiment, an example that the center airbag 38 is connected to the passenger seat airbag 32 via the tear seam 42 in the folded state is shown, the present invention is not limited to this example. For example, a structure in which the center airbag 38 is not connected to the passenger seat airbag 32 is permissible. Even in this structure, the center airbag 38 (side wall 38S thereof) after its inflation and deployment is completed is adapted to be capable of separating from the side wall 32S of the passenger seat airbag 32 at least at its rear portion.

<Second Modification>

Further, although in the above-described embodiments, an example that the inner bag 44 is provided within the center airbag 38 as a gas flow guide member is shown, the present invention is not limited to this example. For example, a structure in which no member corresponding to the gas flow guide member is provided is permissible or for example, a structure in which a gas flow guide member of other shape than the inner bag 44 is provided is also permissible. As the gas flow guide member of other shape, for example, it is permissible to adopt a no-bag like flow straightening cloth.

<Third Modification>

Further, although in the above-described embodiments, an example in which the airbag ECU 46 activates the inflators 30, 34, 40 when the front collision to the vehicle V is detected or estimated based on a signal from the collision sensor 48 is shown, the present invention is not limited to this example. For example, a structure which allows to select whether the inflator 40 should be activated depending on a collision occurrence side of the oblique collision or the small overlap collision, the physical constitution of an occupant (driver D, passenger seat occupant P) on the vehicle seat 12, wearing condition of the seat belt device, seriousness of the collision or the like is also permissible. The airbag ECU 46 may be constructed not to activate the inflator 40 when the occupant is in an out of position condition (illustrated later) while the seriousness of the collision is low. A control example in case where the passenger seat occupant P is in the out of position condition will be described.

In this modification, the airbag ECU 46 is capable of detecting a full-wrap front collision, offset front collision, small overlap collision and oblique collision by distinguishing each collision type based on a signal from the collision sensor 48. Further, the airbag ECU 46 is capable of detecting a collision occurrence side (driver's seat 12D side or passenger seat 12P side) of the small overlap collision or the oblique collision. Further, the airbag ECU 46 is capable of detecting the physical constitution of an occupant and whether any occupant is seated based on a signal from an occupant detecting sensor (load sensor) provided on the vehicle seat 12 and a signal from a seat position sensor for detecting a front-rear slide position of the vehicle seat 12, for example. Further, the airbag ECU 46 is capable of detecting whether it is a light collision or a heavy collision based on a signal from a crush severity sensor. The airbag ECU 46 may detect a collision by distinguishing the degree of the collision at least between two types, i.e., light collision and heavy collision. As a threshold about whether the collision is a light collision or a heavy collision, it is permissible to adopt whether or not its collision speed is 16 miles/hr or less. Still further, the airbag ECU 46 is capable of detecting whether the occupant is wearing the seat belt device based on a signal from a buckle switch of the seat belt device.

Then, when the oblique collision or the small overlap collision to the driver's seat 12D side occurs, the airbag ECU 46 is configured to inhibit activation (never permits activation at the time of the front collision) of the inflator 40 under following three patterns. A first pattern is a case where the oblique collision or the small overlap collision to the driver's seat 12D side is a light collision and the physical constitution of the passenger seat occupant P is smaller than a standard physical constitution (a case of the out-of-position condition). A second pattern is a case where the oblique collision or the small overlap collision to the driver's seat 12D side is a light collision and the passenger seat occupant P is not wearing the seat belt device (another case of the out-of-position condition). In these cases of the light collisions, the airbag ECU 46 activates the inflator 34 so that the passenger seat occupant P is protected by the passenger seat airbag 32. On the other hand, when the oblique collision or the small overlap collision to the driver's seat 12D side is a heavy collision, the airbag ECU 46 is configured to activate the inflator 40 even if the passenger seat occupant P on the passenger seat 12P is in the out of position condition. Next, the third pattern is a case where no occupant is seated on the passenger seat 12P. In this pattern, the airbag ECU 46 is configured not to activate any of the inflators 34 and 40.

On the other hand, when the oblique collision or the small overlap collision to the passenger seat 12P side occurs, the airbag ECU 46 is configured to activate the inflators 34 and 40. That is, the airbag ECU 46 activates the inflators 34, 40 regardless of the seated condition of the passenger seat occupant P (whether in the out-of-position condition), whether the passenger seat occupant P is seated, and the degree of a collision (light collision or heavy collision). As a result, when the oblique collision or the small overlap collision to the passenger seat 12P side occurs, the driver D moving to the obliquely forward collision side can be constrained effectively as described above.

<Fourth Modification>

Figure 5:
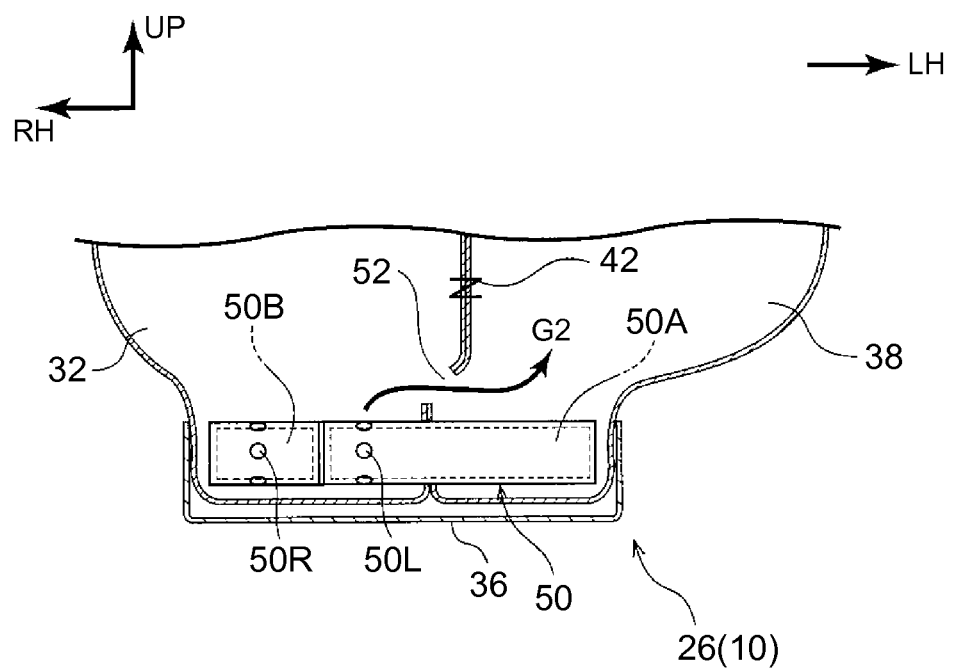
FIG. 5 is an enlarged plane cross sectional view showing a modification of a gas supplying structure from the passenger seat airbag to a center airbag according to the embodiment of the present invention by enlargement.

Still further, although in the above-described embodiments, an example in which the center airbag 38 and the passenger seat airbag 32 are supplied with gas from the separate inflators 34, 40 is shown, the present invention is not limited to this example. For example, it is permissible to adopt a structure in which a two-stage ignition type dual inflator 50 is provided instead of the inflators 34, 40 as shown in FIG. 5. The dual inflator 50 is formed in a cylindrical shape such that it is arranged with the vehicle width direction as its longitudinal direction and that ignition agents of its left, right combustion chambers 50A, 50B are to be ignited independently. As a result, gas is spouted from the left, right gas spouting ports 50L, 50R individually.

Then, the left, right gas spouting ports 50L, 50R are arranged within the proximal end portion of the passenger seat airbag 32. The proximal end portion of the passenger seat airbag 32 and the proximal end portion of the center airbag 38 communicate with each other via a communication passage 52. That is, gas is supplied to the center airbag 38 from the passenger seat airbag 32. Then, when the front collision to the vehicle V is detected or estimated based on a signal from the collision sensor 48, the airbag ECU 46 activates the inflator 30 and the right combustion chamber 50A of the dual inflator 50 (ignites the first stage).

Further, the airbag ECU 46 has a structure for performing the same control as the control relating to the above-described third modification. That is, in the third modification, under the condition in which the inflators 34, 40 are activated together, the left, right combustion chambers 50A, 50B are ignited independently. In this case, first, the ignition agent of the right combustion chamber 50B is ignited (ignition of the first stage) and after a predetermined time interval (e.g., about 5 msec), the ignition agent of the left combustion chamber 50A is ignited. Upon the ignition of the first stage, gas is supplied to mainly the passenger seat airbag 32 while the center airbag 38 is not inflated and deployed. Upon the ignition of the second stage, gas is also supplied to the center airbag 38 (see an arrow G2), the center airbag 38 is inflated and deployed.

Further, in the third modification, under the condition in which the inflator 34 is activated while the inflator 40 is not activated, only the ignition agent of the right combustion chamber 50B is ignited. In this case, as described above, gas is supplied to mainly the passenger seat airbag 32 and the center airbag 38 is not inflated and deployed. The internal pressure of the passenger seat airbag 32 in this case is an internal pressure suitable for protecting the passenger seat occupant P in the out-of-position condition and in the present modification, set to be lower than an internal pressure when the passenger seat airbag is inflated and deployed by gas supplied from the inflator 34. In the meantime, when the left, right combustion chambers 50A, 50B are ignited independently, the internal pressures of the passenger seat airbag 32 and the center airbag 38 are equal to the internal pressure when they are inflated and deployed by gas supplied from the inflators 34, 40.

<Fifth Modification>

Figure 6:
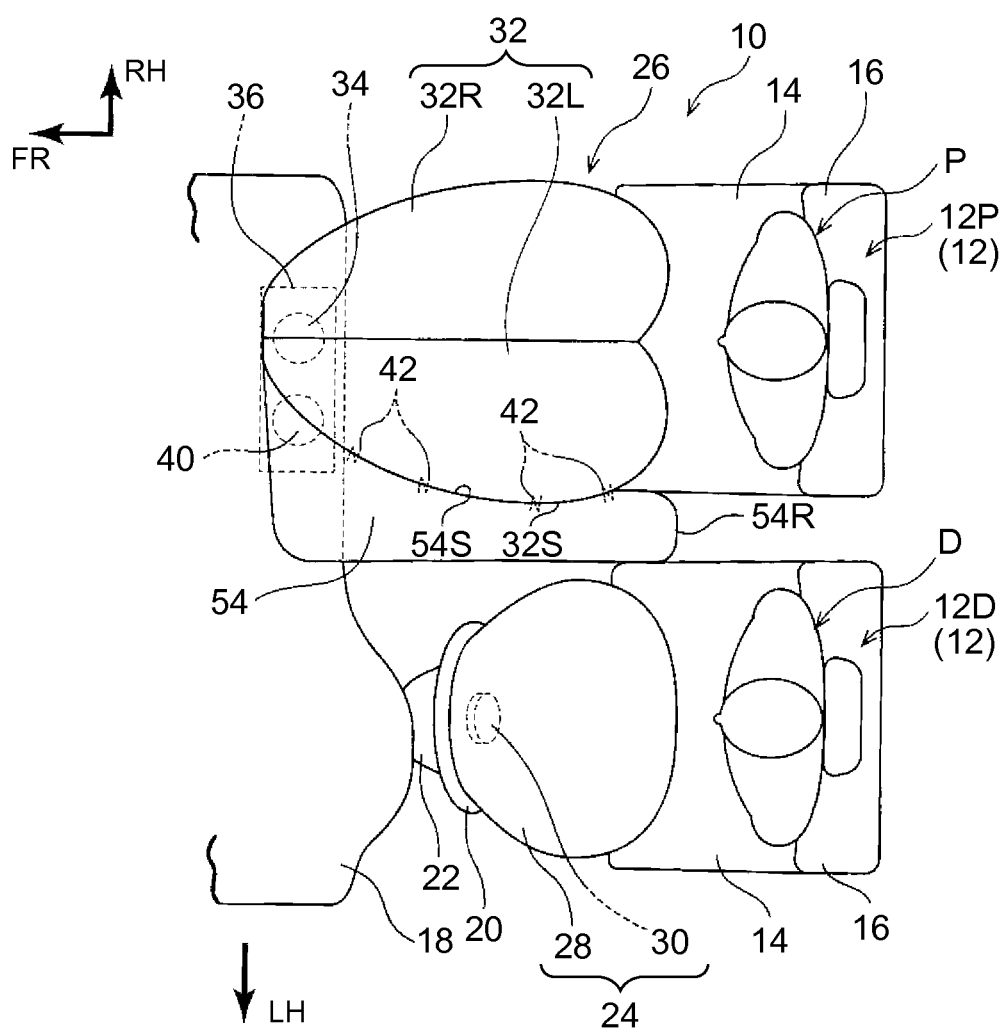
FIG. 6 is a plan view corresponding to FIG. 1 showing a modification of the shape of the center airbag according to the embodiment of the present invention.

Further, although in the above-described embodiments, the example that the center airbag 38 has the protruding portion 38P is shown, the present invention is not limited to this example. For example, as shown in FIG. 6, a center airbag 54 may be provided instead of the center airbag 38. The center airbag 54 has the same plan view shape and side view shape as the main body portion 38M of the center airbag 38 in the inflated and deployed state. That is, a side wall 54S facing the passenger seat airbag 32 side at least on a rear end 54R side of the center airbag 54 can be separated from the side wall 32S of the passenger seat airbag 32. This structure also can obtain a similar operation and effect to the above-described embodiments except the operation and effect by the protruding portion 38P.

<Other Modification>

Further, although in the above-described embodiment, the example that the passenger seat airbag 32 is a twin-chamber type airbag is shown, the present invention is not limited to this example. For example, the passenger seat airbag 32 may be a single-chamber type airbag.

Still further, although in the above-described embodiments, the example that the inflator 40 is arranged at an offset position outward with respect to the inflation and deployment position of the center airbag 38 in the vehicle width direction is shown, the present invention is not restricted to this example. For example, the deployment positions of the center airbag 38 and the installation position of the inflator 40 may coincide with each other in terms of the vehicle width direction or partly overlap each other.

Further, although in the above-described embodiment, the example that the center airbag 38 is accommodated in the airbag case 36 common to the passenger seat airbag 32 is shown, the present invention is not limited to this example. The present invention may have any structure as long as the center airbag 38 and the passenger seat airbag 32 are accommodated in the instrument panel 18 together and their rear end sides are inflated and deployed such that they can separate from each other in the vehicle width direction, and these airbags may be accommodated in different airbag cases. In the meantime, the structure in which the center airbag 38 and the passenger seat airbag 32 are accommodated in the instrument panel 18 together is a structure in which they are inflated and deployed to the cabin C side by breaking the common airbag door.

It is not needless to say that the present invention may be carried out in various modifications within a range not departing from the spirit thereof.

What is claimed is:

1. A front seat airbag system comprising:
a driver's seat airbag which is inflated and deployed in front of a driver's seat by being supplied with gas;
a passenger seat airbag which is inflated and deployed in front of a passenger seat by being supplied with gas; and
a center airbag which is accommodated in an instrument panel together with the passenger seat airbag, the center airbag is a bag body independent of the passenger airbag and, when supplied with gas, is inflated and deployed on a vehicle central side of the passenger seat airbag in a vehicle width direction; and
wherein a region on a rear end side of the center airbag, in a vehicle longitudinal direction in the inflated and deployed state, is connected to a region on a rear end side of the passenger seat airbag, in the vehicle longitudinal direction in the inflated and deployed state, via a tear seam to connect the center airbag and the passenger seat airbag from a front end side of the center airbag to the rear end side of the center airbag, in the vehicle longitudinal direction in the inflated and deployed state,
wherein the tear seam is configured to be broken during the inflation and deployment process of the center airbag such that the center airbag is separate from the passenger seat airbag, in the vehicle width direction, when the inflation and expansion of the center airbag is completed.

2. The front seat airbag system according to claim 1, wherein
the tear seam is configured to be broken by receiving a tension larger than a predetermined value in the inflation and deployment process of the passenger seat airbag and the center airbag.

3. The front seat airbag system according to claim 1, wherein
the center airbag includes a main body portion in which a rear end side thereof in the vehicle longitudinal direction is configured to separate from the rear end side of the passenger seat airbag in the vehicle longitudinal direction in an inflated and deployed state; and
a protruding portion which is inflated and deployed such that it is protruded to a driver's seat airbag side from the main body portion.

4. The front seat airbag system according to claim 3, wherein the center airbag is constructed that in the inflated and deployed state, a rear end of the protruding portion in the vehicle longitudinal direction is located in front of a steering wheel.

5. The front seat airbag system according to claim 3, wherein
in the inflated and deployed state, at least a part of the protruding portion overlaps a vehicle width direction inside end of the driver's seat airbag along the vehicle width direction.

6. The front seat airbag system according to claim 1, wherein
in a state in which no occupant in the driver's seat or the passenger seat is constrained, the center airbag is inflated and deployed into a shape not interfering with the driver's seat airbag in the inflated and deployed state.

7. The front seat airbag system according to claim 1 further comprising:
a gas supplying device which is arranged in an inflation and deployment range of the passenger seat airbag in the vehicle width direction and is arranged within the center airbag so as to supply the center airbag with gas; and
a gas flow guide member which guides gas generated by the gas supplying device inward in the vehicle width direction to make the gas flow out backward in the vehicle longitudinal direction.

8. The front seat airbag system according to claim 7, wherein
the gas flow guide member is folded together with the center airbag and accommodates at least a gas spouting port of the gas supplying device and is a cylindrical bag body extending inward from the gas spouting port side in the vehicle width direction in a gas guiding state, and has a gas flow-out port which is open backward in the vehicle longitudinal direction at a vehicle width direction inside with respect to the gas spouting port.

9. The front seat airbag system according to claim 1, wherein
a top end of the center airbag in a vehicle up-and-down direction in the inflated and deployed state is located below a top end of the passenger seat airbag in the vehicle up-and-down direction in the inflated and deployed state and a vent hole is formed in an inside wall of the passenger seat airbag facing a vehicle width direction inside in the inflated and deployed state, the vent hole being located above the center airbag in the vehicle up-and-down direction.

10. The front seat airbag system according to claim 1, wherein
the center airbag is accommodated in the instrument panel in a state in which it is accommodated in an airbag case common to the passenger seat airbag.

11. The front seat airbag system according to claim 1, wherein
no vent hole is set in the center airbag.

12. The front seat airbag system according to claim 1, wherein
the rear end of the center airbag in the inflated and deployed state is located at an equivalent position to the rear end of the passenger seat airbag or slightly backward thereof.

13. The front seat airbag system according to claim 1 further comprising:
a gas supplying device which is arranged in an inflation and deployment range of the passenger seat airbag in the vehicle width direction and is arranged on a bottom side of the inflation and deployment range of the passenger seat airbag in a vehicle up-and-down direction and is arranged in the center airbag so as to supply the center airbag with gas.

14. The front seat airbag system according to claim 1 further comprising:
a control device which is connected to a collision sensor so as to detect or estimate a collision and control supply of gas to each airbag, wherein
the control device delays a supply of gas to the center airbag with respect to a supply of gas to the driver's seat airbag and the passenger seat airbag.

15. The front seat airbag system according to claim 1 further comprising:
a control device which is connected to a collision sensor so as to detect or estimate a collision and control supply of gas to each airbag, wherein
the control device classifies a degree of the collision to at least a light collision and a heavy collision and when the control device detects the light collision in a oblique collision or a small overlap collision to a driver's seat side, it inhibits supply of gas to the center airbag.

16. The front seat airbag system according to claim 1, wherein
a two-stage ignition type dual inflator supplies the passenger seat airbag and the center airbag with gas.

17. A vehicle comprising:
a driver's seat;
a passenger seat; and
a front seat airbag system according to claim 1.

18. The vehicle according to claim 17, wherein
no central seat for the front seat is arranged between the driver's seat and the passenger seat.

19. The front seat airbag system according to claim 1 wherein
the control device is an electronic control unit.

20. A front seat airbag system comprising:
a driver's seat airbag which is inflated and deployed in front of a driver's seat by being supplied with gas;
a passenger seat airbag which is inflated and deployed in front of a passenger seat by being supplied with gas; and
a center airbag which is accommodated in an instrument panel together with the passenger seat airbag, the center airbag is a bag body independent of the passenger airbag and, when supplied with gas, is inflated and deployed on a vehicle central side of the passenger seat airbag in a vehicle width direction; and
wherein a region on a rear end side of the center airbag, in a vehicle longitudinal direction in the inflated and deployed state, is connected to a region on a rear end side of the passenger seat airbag, in the vehicle longitudinal direction in the inflated and deployed state, via a tear seam such that the center airbag contacts the passenger seat airbag from a front end side of the center airbag to the rear end side of the center airbag, in the vehicle longitudinal direction in the inflated and deployed state,
wherein the tear seam is configured to be broken during the inflation and deployment process of the center airbag such that the center airbag is separate from the passenger seat airbag, in the vehicle width direction, when the inflation and expansion of the center airbag is completed.

* * * * *